2,815,295

LINOLEUM CEMENTS

Alan K. Forsythe, Manor Township, Lancaster County, Pa., assignor to Armstrong Cork Company, Lancaster, Pa., a corporation of Pennsylvania No Drawing. Application June 30, 1954, Serial No. 440,529

5 Claims. (Cl. 106—123)

This invention relates to linoleum cements. More particularly, the invention relates to a linoleum cement containing a tall oil ester and an essentially resin free unsaturated fatty acid ester, such as soya bean fatty acid or tall oil fatty acids which have been esterified with a polyfunctional alcohol.

Linoleum cements have been made for a number of years from a drying oil and a resin by a number of methods, which result in the production of a siccative oil-resin gel by oxidizing and polymerizing the drying oil, generally in the presence of the resin. Ordinarily, linoleum cements comprise about 65% to about 85% drying oil and about 35% to about 15% resin. For many years, linoleum cements were manufactured from a resin such as rosin and a siccative oil such as a drying oil, for example linseed oil, or a semi-drying oil, for example soya bean oil. However, recently other materials have been proposed for use in place of a portion or all of the drying oil component or the resin component of the linoleum cement. For example, tall oil has been proposed as a replacement for a portion of the drying oil component of the cement.

Tall oil is a by-product of the manufacture of kraft paper by the sulfate process from pine or fir wood and is generally considered to be a mixture of fatty acid, resin acid, and unsaponifiable material. Generally speaking, the fatty acids fraction of a typical crude tall oil includes saturated fatty acids, oleic acid and linoleic acid. Linoleum cements containing substantial quantities of tall oil have been prepared and successfully employed in the manufacture of linoleum compositions. These compositions may be employed in the preparation of floor or wall coverings which have generally the flexibility and resilience found in linoleum which is prepared from a siccative oil-resin gel produced by the oxidation and polymerization of a drying oil such as linseed oil and a resin such as rosin.

Generally speaking, however, cements containing tall oil are somewhat more thermoplastic than ordinary linoleum cements; and floor coverings manufactured from compositions containing such cements may soften at elevated temperatures, thereby resulting in excessive indentation and a fairly high degree of dirt retention. Thus these floor coverings may be adversely affected in warm climates or under extreme summer conditions. In addition, the free fatty acids in tall oil further reduce the alkali resistance and are detrimental to the drying properties of the composition.

It has been found that a drying oil substitute may be prepared by heating tall oil at selected temperatures in the presence of selected amounts of polyhydric alcohol. The esterification product of the type obtained by that process may be employed in the production of linoleum cement without removal of the resin acids. Such a procedure is disclosed and claimed in Dunlap application Serial No. 203,017, filed December 27, 1950, Patent No. 2,752,262. In accordance with the invention of that application, highly desirable linoleum cements may be prepared by oxidizing and polymerizing a mixture containing reduced amounts of drying oil and a substantial amount of the esterification product referred to above.

The tall oil is first selectively esterified under carefully controlled conditions with a polyhydric alcohol, containing from 3 to 5 carbon atoms, such as glycerol and pentaerythritol. By such a procedure, only the fatty acids of the tall oil are esterified; and the rosin remains substantially unesterified. Such esters are referred to as partial esters of tall oil. To obtain selective and substantially complete esterification of only the fatty acid constituents of the tall oil, the temperature should be at least 180° C. Depending upon the time of the esterification step, higher temperatures may be used, but in no event should these temperatures exceed about 250° C., for at this temperature and above a significant portion of the rosin component of the tall oil is esterified and contaminates the desired drying oil substitute residue. In operating at higher temperatures, it is advantageous to reduce the time of exposure of the tall oil to the polyhydric alcohol, as more desirable products are obtained at the higher end of the temperature range when the time of treatment is comparatively short. For example, at a temperature of 220° C., selective esterification is accomplished in about one hour, whereas at a temperature of about 250° C., selective esterification occurs in about 15 to 20 minutes. In any event, the reaction is allowed to proceed until the total acid number of the reaction mass approximates the rosin acid number.

A typical example of the preparation of partial ester of tall oil is as follows:

Example I 1202.1 grams of a tall oil having a fatty acid number of 70, a rosin acid number of 96, and a total acid number of 166 were placed in a two-liter flask and heated to 150° C. At this point, 59.7 grams of pentaerythritol were added. When the temperature reached 180° C., lead naphthenate catalyst was added to start the esterification reaction. After one-half hour to allow the pentaerythritol to dissolve, a sample was taken and the acid number was determined. The reaction was continued with agitation for ten hours at about 180° C. At this time, the total acid number was 95.7, and the rosin acid number was 89.1, indicating that all but an insignificant amount of the fatty acids had been esterified and that all but an insignificant amount of rosin acids had not been esterified.

Prior to my invention, it has been the practice in the production of linoleum binder material or linoleum cements on compositions containing such a partially esterified tall oil as is illustrated by Example I to dilute the tall oil ester with natural drying oils, such as linseed oil. The reason for this dilution is that selective esterification or partial esterification with polyhydric alcohol such as pentaerythritol forms a mixture which, because of the nature of the original tall oil, corresponds to some extent to a mixture of rosin and siccative oil. However, such a mixture per se is somewhat undesirable from the standpoint of the manufacture of linoleum binder because of its comparatively high rosin content. It has been found that the properties of linseed oil or other naturally occurring drying oils and tall oil partial esters are such that they may be blended in any proportion, preferably those resulting in rosin contents of about 20% to about 30%, thereby making a material which is suitable for the manufacture of linoleum binder.

I have found that an essentially resin free unsaturated fatty acid such as soya bean oil fatty acid or tall oil fatty acid may be esterified with a polyfunctional alcohol and employed as the additive to partial ester of tall oil, thereby resulting in a linoleum binder material which is substantially completely free from naturally occurring drying oils. In accordance with my invention, the tall oil ester is prepared as indicated above, such as in Example I, and then blended with additional tall oil fatty acid ester to produce by oxidation a highly desirable linoleum binder material. The blend of esters is advantageously such that the rosin acid number thereof, as determined by the Modified Wolff Method, ASTM D803–49T, is between about 35 to about 48. Particularly advantageous results have been obtained with ester blends having rosin acid numbers of about 40 to about 43. If desired, the fatty acids may be mixed with the tall oil and the esterification may be carried out in a single operation. It is possible within the scope of my invention to esterify the substantially resin free fatty acid, add rosin, and make an acceptable material. Products made by any one of these methods have been found to oxidize in the manner known to the art in the manufacture of linoleum cement to produce a tough linoleum binder gel. The gel may be compounded and cured in a conventional manner to produce an acceptable sheet. My invention may be illustrated by reference to the following specific examples:

II. Esterified separately by heating at 392° F. for 5 hours under $CO_2$
    (a) 1855 grams tall oil fatty acid
        252 grams pentaerythritol and
    (b) 1855 grams crude tall oil
        93 grams pentaerythritol Oxidized mixture of above by blowing air through the mass at the rate of 6 liters per minute while agitating in a mechanical oxidizer at 180° F.
    258 grams of (b) ester
    242 grams of (a) ester
    20 c. c. drier (lead and manganese tallate containing 15% lead and .025% manganese)

Ran 1697 minutes. A sheet made from above cement cured in 408 hours at 180° F.

III. Esterified together by heating at 392° F. for 5 hours under $CO_2$
    805 grams crude tall oil
    945 grams tall oil fatty acid
    162 grams pentaerythritol Oxidized resulting product by blowing air through the mass at the rate of 6 liters per minute while agitating in a mechanical oxidizer at 200° F.
    500 grams of above
    20 c. c. drier (lead and manganese tallate containing 15% lead and .025% manganese)
    5 grams p-toluene sulfonic acid Ran 1210 minutes. A sheet made from above cement cured in 672 hours at 180° F.

The composition formed into a sheet in Examples II and III contained 222 parts by weight cement, 144 parts by weight wood flour, and 234 parts by weight whiting.

Generally speaking, compositions suitable for use in the manufacture of floor, wall, or similar surface coverings may contain about 36% to about 39% by weight binder or cement, about 6% to about 11% by weight pigment, and about 51% to about 58% filler. The particular proportions may vary, depending, among other things, upon the particular method to be practiced in forming the sheet, such as molding, calendering, and the like, and the color of the finished product.

I claim:
1. A linoleum cement comprising the product obtained by oxidizing with air a mixture consisting essentially of tall oil fatty acids esterified with a polyhydric alcohol having 3–5 carbon atoms and rosin, said mixture having a rosin acid number in the range of about 35–48.
2. A linoleum cement according to claim 1 wherein said polyhydric alcohol is pentaerythritol.
3. A linoleum cement according to claim 1 wherein said polyhydric alcohol is glycerine.
4. A linoleum cement according to claim 1 wherein said rosin acid number is in the range of about 40–43.
5. A linoleum composition comprising the linoleum cement of claim 1, wood flour, and whiting.

References Cited in the file of this patent
UNITED STATES PATENTS

| | | |
|---|---|---|
| 2,439,377 | Bare et al. | Apr. 13, 1948 |
| 2,503,772 | Rust | Apr. 11, 1950 |
| 2,584,300 | Simmers | Feb. 5, 1952 |

OTHER REFERENCES

Matiello: "Protective and Decorative Coatings," vol. 1, page 203, 1941.